(12) United States Patent
Ahmad et al.

(10) Patent No.: US 7,222,251 B2
(45) Date of Patent: May 22, 2007

(54) MICROPROCESSOR IDLE MODE MANAGEMENT SYSTEM

(75) Inventors: Sagheer Ahmad, Sunnyvale, CA (US);
Erik Norden, Santa Clara, CA (US);
Rob Ober, San Jose, CA (US)

(73) Assignee: Infineon Technologies AG, Munich (DE)

( * ) Notice: Subject to any disclaimer, the term of this patent is extended or adjusted under 35 U.S.C. 154(b) by 710 days.

(21) Appl. No.: 10/358,181

(22) Filed: Feb. 5, 2003

(65) Prior Publication Data
US 2004/0153678 A1  Aug. 5, 2004

(51) Int. Cl.
*G06H 13/24* (2006.01)
(52) U.S. Cl. ............ 713/322; 713/320; 713/321; 713/32; 713/324; 710/260; 710/261; 710/262; 710/263; 710/264; 710/265; 710/267; 710/268; 710/269
(58) Field of Classification Search ............ 713/300, 713/323–324
See application file for complete search history.

(56) References Cited
U.S. PATENT DOCUMENTS

| | | | | |
|---|---|---|---|---|
| 4,376,973 A | * | 3/1983 | Chivers | 712/229 |
| 5,826,084 A | * | 10/1998 | Brooks et al. | 718/107 |
| 5,862,389 A | * | 1/1999 | Kardach et al. | 710/266 |
| 5,913,045 A | * | 6/1999 | Gillespie et al. | 710/311 |
| 6,243,817 B1 | * | 6/2001 | Melo et al. | 713/300 |
| 6,389,526 B1 | * | 5/2002 | Keller et al. | 712/30 |
| 6,549,965 B1 | * | 4/2003 | Jones et al. | 710/264 |
| 6,633,940 B1 | * | 10/2003 | Alasti et al. | 710/262 |
| 6,760,852 B1 | * | 7/2004 | Gulick | 713/324 |
| 6,772,241 B1 | * | 8/2004 | George et al. | 710/36 |

* cited by examiner

*Primary Examiner*—A S Elamin
(74) *Attorney, Agent, or Firm*—Staas & Halsey LLP

(57) ABSTRACT

An idle mode system has a clock gating circuit, a bus interface unit, memory interfaces and an interrupt and idle control unit. The clock gating circuit receives a first clock and designated idle-acknowledge signals. The clock gating circuit produces a second clock signal based on the first clock signal when fewer than all designated idle-acknowledge signals are received. The clock gating circuit produces no second clock signal when all designated idle-acknowledge signals are received. The bus interface unit receives bus access requests and receives the first and second clock signals. When a bus access request is made, the bus interface unit de-asserts its idle-acknowledge signal and passes the bus access request. The memory interfaces operate on the second clock. One interface receives the bus access request from the bus interface unit, withdraws its idle-acknowledge signal, processes the bus access request, and re-asserts its idle-acknowledge signal upon completion.

10 Claims, 2 Drawing Sheets

MICROPROCESSOR IDLE MODE MANAGEMENT SYSTEM

BACKGROUND OF THE INVENTION

Modern computer processor chips have an idle mode such that the processor shuts down when not in use. This minimizes the power consumption and heat dissipation and may prolong the life of the processor chip. Once asleep, there must be some mechanism to wake the processor chip. Preferably, the processor system will instantaneously wake up when needed. In order to accomplish this goal, various portions of the system must stay awake while others are sleeping. To operate, the awake portions of the system continue to receive a clock signal. While some portions of the clock are turned off, others are left on. Complicated clock gating schemes have been proposed to accomplish this task.

Interrupt signals indicate that the processor should stop its current action and perform an action indicated by the interrupt signal. Therefore, the interrupt signals must eventually get to the processor. However, sometimes multiple interrupt signals are received at almost the same time. These multiple interrupt signals likely have different priority. Further, it may be possible to mask selected interrupt signals. To assess incoming interrupt signals, it has been proposed to send all interrupt signals to a main processor for evaluation. However, this wastes processor resources.

SUMMARY OF THE INVENTION

Accordingly, it is one possible object to provide for an idle mode system and method with a simplified clock gating scheme. It is a further possible object to remove interrupt assessment tasks from the main processor.

To possibly address these and/or other goals, the inventors propose an idle mode system having among other possible units, a clock gating circuit, a bus interface unit and memory interfaces. The clock gating circuit receives a first clock and designated idle-acknowledge signals. The clock gating circuit produces a second clock signal based on the first clock signal when fewer than all designated idle-acknowledge signals are received. The clock gating circuit produces no second clock signal when all designated idle-acknowledge signals are received. The bus interface unit receives bus access requests and receives the first and second clock signals. When a bus access request is made, the bus interface unit de-asserts its idle-acknowledge signal and passes the bus access request to the targeted memory interface. The memory interfaces operate on the second clock, and when a bus access request is received from the bus interface unit, the targeted memory interface withdraws its idle-acknowledge signal, processes the bus access request, and re-asserts its idle-acknowledge signal upon completion.

The inventors also propose an interrupt system having memory interfaces, a processor pipeline control unit and an interrupt controller. The processor pipeline control unit is connected to the memory interfaces to fetch instructions for processing. The interrupt controller is separate from the processor pipeline and receives a plurality of different interrupt signals. The interrupt controller determines which of the interrupt signals are valid interrupt signals, prioritizes valid interrupt signals and passes valid interrupt signals to the processor pipeline control unit one-by-one.

The inventors further propose an idle mode system having memory interfaces, a processor pipeline control unit connected to the memory interfaces to fetch instructions for processing, an idle mode system and a read/write access control unit. The idle mode system puts the processor pipeline control unit into an idle mode so as to temporarily stop operation of the processor pipeline control unit. The read/write access control unit reads or writes data to or from the memory interfaces without taking the processor pipeline control unit out of the idle mode.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
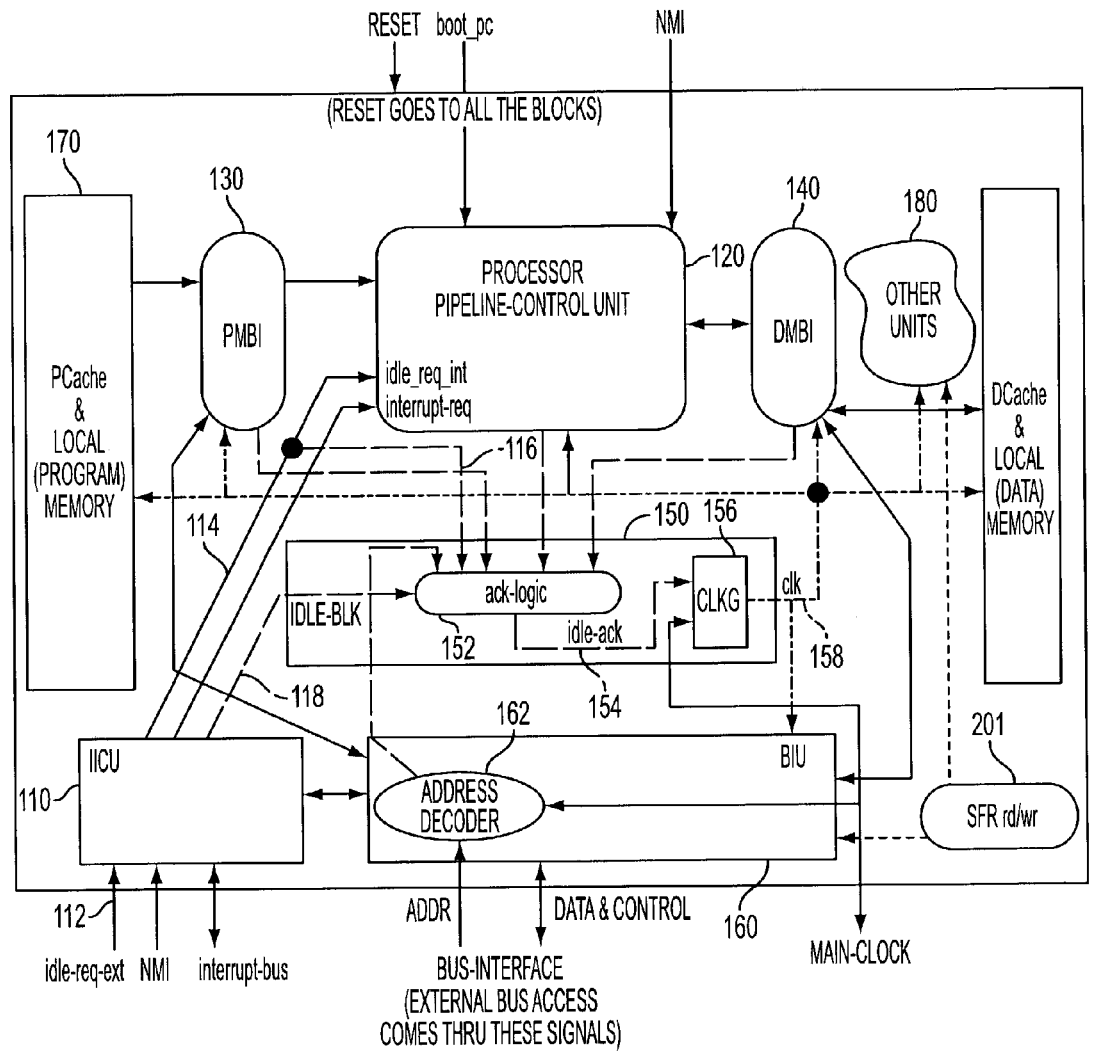
FIG. 1 is a schematic view of the power management and idle mode architecture of a processor system.

Reference will now be made in detail to the preferred embodiments of the present invention, examples of which are illustrated in the accompanying drawings, wherein like reference numerals refer to like elements throughout.

FIG. 1 is a schematic view of the power management and idle mode architecture of a processor system. The system may be embodied as a central processor unit (CPU) chip embedded in a computer. To enter into the idle mode, an idle request is sent by the user to an interrupt and idle control unit (IICU) 110 along line 112. The IICU 110 sends the idle request to a processor pipeline control unit 120. The processor pipeline control 120 unit is the controller of the processor and is one of the units within the system. The processor pipeline control unit 120 controls the flow of instructions from a program memory bus interface (PMBI) 130 and the flow of instructions to and from a data memory bus interface (DMBI) 140. The idle request is sent to the processor pipeline 120 along line 114. In the same operation, the idle request is also sent to an idle block 150 along line 116. When the processor pipeline 120 finishes executing its current instruction, the processor pipeline 120 makes sure that no new instructions get fetched and that the pipelines get emptied. The processor pipeline 120 stores a return address where it stopped in a program counter (PC). When all of this is done, the processor pipeline 120 sends an idle-acknowledge signal ("idle-ack") to an acknowledge logic unit 152 within the idle block 150. When the PMBI 130 and/or DMBI 140 are finished working with the processor pipeline 120, they also send respective idle-acknowledge signals to the acknowledge logic unit 152.

There are two additional idle-acknowledge signals which the acknowledge logic unit 152 receives. These two additional signals are produced by the idle and interrupt control unit 110 and a bus interface unit (BIU) 160. Whether the IICU 110 and the BIU 160 are busy is not necessarily dependent on the operations of the processor pipeline 120. Therefore, the IICU 110 and the BIU 160 transmit their idle-acknowledge signals to the acknowledge logic unit 152 whenever they are not operating. Once the acknowledge logic 152 unit has received all of the idle-acknowledge signals, a gating signal is sent on line 154 to a clock gate 156. The clock gate 156 then stops the main clock from flowing out to the rest of the system along line 158. When the clock is stopped on line 158, the system goes into the idle mode. It should be noted that in addition to the units 110,120,130,140,150 and 160, the processor system has other units 180.

For the IICU 110, the functions of the idle request signal traveling on line 114 and the idle-ack signal traveling on line 118 somewhat overlap. Both the idle request signal and the idle acknowledgment signal are sent to the ack logic unit 152. When the ack logic unit 152 receives both the idle request signal and idle acknowledgment signal from the IICU 110, the clock can be turned off. Similarly, when the IICU 110 withdraws either its idle request signal or its idle acknowledgment signal, the clock starts. Which signal is used to start the clock depends on the desired action. If the desired action requires that the processor pipeline be awake, then IICU 110 starts the clock and wakes the processor by de-asserting its idle request signal. On the other hand, if the desired action does not require that the processor pipeline 120 be awake, then the IICU 110 de-asserts its idle acknowledgment signal to start the clock while allowing the processor pipeline 120 to stay asleep.

The processor pipeline 120 stays in idle mode as long as it receives the idle request signal along line 114. It stays in idle mode even if the clock on line 158 has been reactivated. Once the idle request is de-asserted so as to activate the processor pipeline 120, the processor pipeline 120 injects the return address, which it previously stored in the program counter. At this point, the system returns to its normal mode.

As mentioned above, the processor pipeline 120 does not shut down until the last instruction has been completed. If the processor pipeline 120 requests instructions from the program memory bus interface 130, the PMBI 130 looks to a cache and local memories 170 for the information. If there is a cache miss, this means that the information is not stored in the cache 170, but may be stored elsewhere, such as on a hard disk. In this case, both the processor pipeline 120 and the PMBI 130 stay active until the information has been returned. Although the PMBI 130 and DMBI 140 work together with the processor pipeline 120, they also function independently. Both the PMBI 130 and DMBI 140 send their idle-acknowledge signals to the acknowledge logic unit 152 whenever they are not operating.

The system shown in FIG. 1 reduces power consumption by disabling its internal clock when no instructions are to be processed. To simplify the idle-mode design, the clock is gated only at one place. The Idle mode is supported by the idle request signal and the idle-acknowledge signal.

While in the idle mode, the system can service external bus access requests targeting the scratch pad memories and special function registers ("SFRs"). In such a case, the clock gate 156 temporarily turns on the clock until the access is serviced. Then the clock gets disabled again.

Also, while in the idle mode, the system can still service external interrupts. In such a case, the clock gets turned on temporarily until the access is serviced. Then the clock gets disabled again. The various blocks of the FIG. 1 system will now be discussed in more detail.

The bus interface unit (BIU) 160 is split into two parts. A first part 162 is always active. The first part 162 receives the ungated main clock signal. The second part is represented in FIG. 1 as the remainder of the BIU 160. The second part is connected to the gated clock signal from the clock gate 156. The second part is active only when the gated clock signal is on.

Whenever an external bus access request is received at the BIU 160, this request is reviewed by the first part of the BIU, an address compare unit. The first part is always on. The first part compares the address of the request with the relevant address of the processor device. If the addresses match, then the BIU passes the external access requests to the relevant unit within the device.

The reason why the BIU is divided into first and second parts, one always active, and one sometimes active, relates to the device being in idle. When in idle, the clock must be started before the bus access request can be processed. Because the first part 162 of the BIU 160 is always active, the BIU 160 can de-assert its idle request in the clock cycle following receipt of the external bus access request. The de-assertion of the idle request starts the clock and it activates the relevant device. It should be noted that for a lower frequency processor (slower clock), the BIU 160 may be able to de-assert its idle-ack in the same clock cycle, even if both the first and second parts of the BIU 160 are operated by the gated clock. This could be done with combinatorial logic, which allows the device to act even if the clock is turned off.

From the external world there are three types of possible bus access requests, program memory read/write, data memory read/write, and special function register (SFR) read/write.

Program and data memory read/writes are similar. The BIU 160 determines if the access request relates to program or data information. It then passes the read/write request onto the program memory bus interface (PMBI) or the data memory bus interface (DMBI) as the case may be. Once the request is completed i.e. data has been read or written, then PMBI or DMBI assert their idle-acknowledge signals so the clock can be turned off when all idle-ack signal are received.

For PMBI and DMBI write operations, the BIU 160 de-asserts its idle-ack when a write request is received. The BIU 160 then passes the write request onto the PMBI 130 or the DMBI 140. The PMBI 130 or the DMBI 140 de-asserts its idle-ack. At this point, BIU 160 can assume that the PMBI 130 or DMBI 140 will properly execute the write operation. Thus, the BIU 160 can re-assert its idle-ack. The BIU 160 can go back to sleep. The clock will stay on until the PMBI 130 or DMBI 140 re-assert their idle-ack. Read operations for PMBI and DMBI are somewhat different. For a read operation, the BIU 160 cannot assume that the task is complete when it passes the request. Specifically, the BIU 160 must wait until the information is returned from the PMBI 130 or DMBI 140. After the information is returned to the BIU 160 and transmitted, then the BIU 160 can re-assert its idle-ack and go back to sleep. The BIU 160 must stay awake until the requested information has been delivered.

In the processor system, special function registers (SFRs) are registers associated with various units of the processor system. These registers can be read and written via external signals and BIU 160. The SFRs can be read/written without waking the processor pipeline control unit 120 or the CPU. There are SFRs in the IICU 110 and various other bocks. Unlike some processor systems, the SFRs of the FIG. 1 system are decentralized, i.e. the SFRs are contained in the unit which needs them most. This can assist in reducing the processor area. Also, containing SFRs in separate units improves timing.

Figure 2:
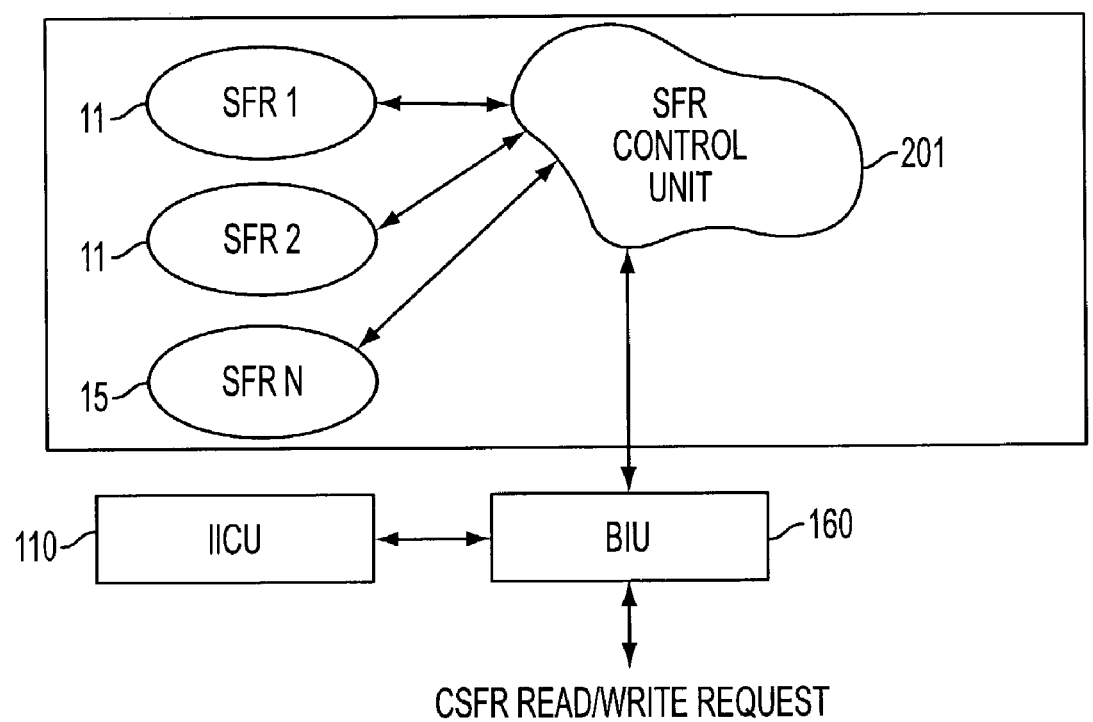
FIG. 2 is a schematic view of an SFR read/write control block and associated components.

FIG. 2 is a schematic view of an SFR read/write control block and associated components. Each SFR is assigned an address. SFRs can be read/written through external bus access. Through external bus access, the user can request to load or store to the address of an SFR. Referring to FIG. 2, the SFR read/write request is sent from the bus interface unit 160 to an SFR read/write control unit 201. The SFR read/write control unit 201 functions somewhat independently of the blocks shown in FIG. 1. Thus, the SFR control unit 201 is shown separately in FIG. 2. The SFR control unit 201 is connected to a plurality of SFRs to 11, 13, 15. Each of these SFRs is located with its associated unit.

After an SFR read/write request has been sent from the BIU 160 to the SFR control unit 201, the SFR control unit 201 passes the request to all units of the processor system, which have an SFR. When received, each associated unit decodes the SFR read/write request and determines if it pertains to the SFR contained therein. The unit which contains the relevant SFR reads or writes to the SFR as requested. Then, the requested data along with an acknowledgment is sent back to the SFR control unit 201. The SFR control unit 201 in turn passes the information to the BIU 160.

During idle-mode, the BIU 160 can receive SFR read/write requests. After receipt, the BIU 160 de-asserts its idle-ack and passes the request to the SFR control unit 201. In other types of memory write operations (PMBI or DMBI), the bus interface unit simply passes the request to the PMBI or DMBI and then re-asserts its idle-ack. That is, BIU goes back to sleep. SFR write operations are somewhat different. For both SFR write operations and SFR read operations, the SFR control unit 201 sends an acknowledge back to the BIU 160 when the operation is complete. The acknowledgement from SFR control unit 201 to BIU 160 should be distinguished from an idle-acknowledgement. As can be seen from FIG. 1, The SFR control unit 201 is not connected to the idle block 150 and does not pass an idle-ack signal to the idle block 150. In addition, the special function registers to which the SFR control unit 201 is connected, may be out of contact with the idle block 150. Therefore, neither the SFR control unit 201 nor the units containing the SFRs can keep the clock running. The BIU 160 does not re-assert its idle-ack until the BIU 160 receives the acknowledgment from the SFR control unit 201. The BIU must stay awake with its idle-ack de-asserted until the read or write operation is complete. For SFRs, the BIU 160 is responsible for keeping the clock running.

With all bus access operations, it is possible to read/write data without disturbing the processor pipeline control unit 120. That is, the read/write operation occurs without waking the CPU, thereby saving power and reducing complexity. The processor pipeline control unit 120 stays in sleep mode as long as it is receiving an idle request signal from the interrupt and idle control unit (IICU) 110.

One final operation of the bus interface unit 160 relates to the IICU 110. As can be seen from FIG. 1, the two units are connected. The IICU 110 contains special function registers which can be read or written through the BIU 160. Unlike the other SFRs, the SFRs in the IICU 110 are not accessed through the SFR control unit 201. This is because the IICU 110 is in communication with idle block 150. By asserting and de-asserting its idle-ack, the IICU 110 is able to keep the clock running. The process described above with regard to the SFR control unit 201 and the BIU 160 keeping the clock running is not necessary.

Turning now to the interrupt and idle control unit 11, the processor system shown in FIG. 1 uses an interrupt arbitration bus such that all interrupt requests are funneled through the interrupt and idle control unit 110. When an interrupt request is received, the IICU 110 verifies that the interrupt request is targeted for the processor pipeline 120. The IICU 110 also determines whether there is a requirement to mask the interrupt request such that the interrupt request is not passed to the processor pipeline 120. In this manner, the IICU validates incoming interrupt requests.

When an interrupt signal is processed in the processor pipeline 120, it instructs the processor pipeline 120 to perform a specific instruction instead of the next instruction in the queue. It is possible that more than one interrupt signal would be received at the same time, each of the different interrupt signals being associated with the different instructions. The IICU 110 performs arbitration in order to prioritize the interrupt signals.

It should be noted that there may be service request nodes associated with various SFRs of the processor system. For example, the IICU 110 contains service request nodes in corresponding SFRs. Service request nodes are in-turn associated with service request routines, which may be located elsewhere. When a service request node is activated, a request for an interrupt is posted to the IICU 110. As mentioned above, the bus interface unit 160 can access the various SFRs of the processor system. If the BIU 160 writes into an SFR with a value that activates a service request node, this could awaken the system.

If the processor system is in the idle mode and an interrupt is requested, the interrupt and idle control unit 110 de-asserts (or takes back) its idle-acknowledge signal from the acknowledge logic unit 152. This is done through a combinatorial circuit, which can act without a clock signal. By de-asserting the idle-ack of the IICU 110, the combinatorial circuit turns on the clock. At the same time, the idle request going form the IICU 110 to the processor pipeline 120 and the idle block 150 is de-asserted to turn on the processor pipeline 120. With these actions, the clock gate 156 outputs the clock on line 158, and the processor pipeline 120 comes alive. With the clock operating, the IICU 110 can verify the interrupt signal and perform arbitration. If there is at least one valid interrupt request, the interrupt request is passed to the processor pipeline 120. The processor pipeline 120, now awake and receiving the clock signal, responds to the interrupt request received from the IICU 110.

A non-maskable interrupt (NMI) is an interrupt signal which must immediately be acted upon. For example, if a processor is about to crash, an NMI may indicate that the available information should be immediately saved. Non-maskable interrupt signals are sent both to the IICU 110 and the processor pipeline 120. As soon as the IICU 110 receives an NMI, it de-asserts its idle-ack to turn on the clock. The NMI, which is separately sent to the processor pipeline 120, can then be processed by the processor pipeline 120. If another interrupt is being processed, the other interrupt is disabled. It should be noted that as with other interrupt signals, an NMI causes the IICU 110 to de-assert the idle request signal, which wakes up the processor pipeline 120. The de-assertion of the idle request also causes the clock signal to again travel on line 158 to the various components.

If the processor unit is in the idle mode, the user can de-assert the idle request. For example, this may occur if the user has been away from the computer for some time and then returns and supplies an input through a keyboard or a mouse, for example. In this case, the interrupt and idle control unit 110 de-asserts the idle request signal going on line 114 to the processor pipeline 120. A corresponding signal also travels along line 116 to the acknowledgement logic 152. This causes the clock gate 156 to turn on the clock 158. Once the device is active, the processor pipeline 120 fetches a program based on the address previously stored in the program counter register.

FIG. 1 shows two other signals that have not yet been discussed, the reset and the boot pc signal. Reset is an external user signal similar to a reboot. The reset tells the processor pipeline 120 to reset the processor and start from an address specified in the boot pc signal. In this manner, when the processor pipeline 120 fetches the next instruction, the next instruction is not fetched from the address stored in the program counter pc. Instead, the processor pipeline 120 fetches the instruction stored that the boot pc address.

The invention has been described in detail with particular reference to preferred embodiments thereof and examples, but it will be understood that variations and modifications can be effected within the spirit and scope of the invention.

What is claimed is:

1. An idle mode system, comprising:
   a clock gating circuit to receive a first clock and designated idle-acknowledge signals, the clock gating circuit producing a second clock signal based on the first clock signal when fewer than all designated idle-acknowledge signals are received, the clock gating circuit producing no second clock signal when all designated idle-acknowledge signals are received;
   a bus interface unit to receive bus access requests and receive the first and second clock signals such that when a bus access request is made, the bus interface unit de-asserts its idle-acknowledge signal and passes the bus access request; and
   memory interfaces operating on the second clock to receive the bus access requests from the bus interface unit, such that when a bus access request is received by one of the memory interfaces, the memory interface withdraws its idle-acknowledge signal, processes the bus access request, and re-asserts it idle-acknowledge signal upon completion.

2. An idle mode system according to claim 1, wherein the bus interface unit has two parts,
   the first part receives the first clock signal and de-asserts the idle-acknowledge of the bus interface unit, and
   the second part receives the second clock signal and passes the bus access request.

3. An idle mode system according to claim 1, wherein the system further comprises a processor pipeline control unit connected to the memory interfaces,
   the processor pipeline control unit receives the second clock signal and an idle request signal, and
   the processor pipeline control unit is in an idle mode when the idle request signal is low such that when the bus interface unit de-asserts its idle-acknowledge signal, the processor pipeline stays in the idle mode as long as the idle request signal is received.

4. An interrupt system, comprising:
   memory interfaces;
   a processor pipeline control unit connected to the memory interfaces to fetch instructions for processing; and
   an interrupt controller, separate from the processor pipeline, to receive a plurality of different interrupt signals, and selectively pass the interrupt signals to the processor pipeline control unit one-by-one wherein
   the system further comprising a clock gating circuit to receive designated idle-acknowledge signals and produce a clock signal when fewer than all of the designated idle-acknowledge signals are received, the clock gating circuit producing no clock signal when all designated idle-acknowledge signals are received,
   the interrupt controller passes an idle-acknowledge signal to the clock gating circuit, and
   the interrupt controller has a combinatorial logic circuit such that when an interrupt signal is received and no clock signal is produced, the combinatorial logic circuit withdraws its idle-acknowledge signal from the clock gating circuit.

5. An interrupt system according to claim 4, wherein the interrupt controller determines which of the interrupt signals are valid interrupt signals, and prioritizes valid interrupt signals before selectively passing the interrupt signals to the processor pipeline control unit.

6. A processor system, comprising:
   special function registers associated with respective units of the processor system;
   a special function register control unit connected to the special function registers to forward read/write requests to the special function registers; and
   a bus interface unit to receive read/write requests for the special function registers, turn a clock on, pass the read/write request to the special function register control unit, wait for a confirmation signal from the special function register control unit and turn the clock off after the confirmation signal is received.

7. A processor system according to claim 6, further comprising:
   memory interfaces,
   a processor pipeline control unit connected to the memory interfaces to fetch instructions for processing; and
   an idle mode system to put the processor pipeline control unit into an idle mode so as to temporarily stop operation of the processor pipeline control unit, wherein
   if the processor pipeline control unit is in the idle mode and the bus interface unit receives a read/write request for one of the special function registers, then none of the special function registers, the special function register control unit and the bus interface unit disturb the idle mode of the processor pipeline control unit while processing the read/write request for the special function register.

8. A processor system according to claim 6, wherein
   the processor system further comprises memory interfaces,
   the bus interface unit communicates with the memory interfaces to read/write data through the memory interfaces,
   the clock is turned on an off through a clock gating circuit,
   the clock gating circuit receives designated idle-acknowledge signals,
   the clock gating circuit turns the clock on when fewer than all designated idle-acknowledge signals are received,
   for write requests for one of the bus interfaces, the bus interface unit de-asserts its idle-acknowledge signal, passes the write request and then re-asserts its idle-acknowledge signal
   for read requests for one of the bus interfaces, the bus interface unit de-asserts its i idle-acknowledge signal, passes the read request, waits for returned information and then re-asserts its idle-acknowledge signal.

9. A processor system according to claim 6, wherein the special function registers are decentralized so as to be located in units associated therewith.

10. A processor system according to claim 6, wherein
a clock is turned on and off through a clock gating circuit,
the clock gating circuit receives designated idle-acknowledge signals,
the clock gating circuit turns the clock on when fewer than all designated idle-acknowledge signals are received,
the clock gating circuit turns the clock off when all designated idle-acknowledge signals are received,
the bus interface unit turns the clock on by de-asserting its idle-acknowledge signal, and
neither the special function registers nor the special function register control unit produce an idle-acknowledge signal.

* * * * *

UNITED STATES PATENT AND TRADEMARK OFFICE
CERTIFICATE OF CORRECTION

| | | |
|---|---|---|
| PATENT NO. | : 7,222,251 B2 | Page 1 of 1 |
| APPLICATION NO. | : 10/358181 | |
| DATED | : May 22, 2007 | |
| INVENTOR(S) | : Sagheer Ahmad et al. | |

It is certified that error appears in the above-identified patent and that said Letters Patent is hereby corrected as shown below:

Column 8, Line 51, after "on" change "an" to --and--.

Column 8, Line 59, after "signal" insert --,--.

Column 8, Line 61, after "its" delete "i".

Signed and Sealed this

Fourth Day of September, 2007

JON W. DUDAS
*Director of the United States Patent and Trademark Office*